US011912534B1

(12) United States Patent
Roberts et al.

(10) Patent No.: US 11,912,534 B1
(45) Date of Patent: Feb. 27, 2024

(54) ELEVATOR PIT SAFETY NET SYSTEM

(71) Applicant: Otis Elevator Company, Farmington, CT (US)

(72) Inventors: Randy Roberts, Hebron, CT (US); Johanna Whitwell, Hartford, CT (US); Craig Drew Bogli, Avon, CT (US); Kyler Vensel, Wolcott, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/332,997

(22) Filed: Jun. 12, 2023

(51) Int. Cl.
*B66B 1/34* (2006.01)
*B66B 5/00* (2006.01)

(52) U.S. Cl.
CPC ............ *B66B 5/005* (2013.01); *B66B 5/0087* (2013.01)

(58) Field of Classification Search
CPC .............................. B66B 5/005; B66B 5/0087
See application file for complete search history.

(56) References Cited

U.S. PATENT DOCUMENTS 6,202,797 B1 * 3/2001 Skolnick ................. B66B 5/005 187/391
7,600,613 B2 * 10/2009 Kang .................... B66B 1/3492 187/394
7,954,606 B2 * 6/2011 Tinone .................... B66B 5/005 187/391
8,556,043 B2 * 10/2013 Mangini ............... B66B 5/0043 187/392
10,983,210 B2 * 4/2021 Wos ......................... G01V 8/20
11,485,608 B2 * 11/2022 Tegtmeier ............... B66B 5/005
11,548,761 B2 * 1/2023 Oggianu ................. B66B 5/025
11,667,494 B2 * 6/2023 Kattainen ............. B66B 5/0056 187/247
2008/0084317 A1 * 4/2008 Gakhar ................... F16P 3/147 340/572.1
2008/0223667 A1 * 9/2008 Tinone .................... B66B 5/005 187/392
2012/0018256 A1 * 1/2012 Mangini ................. B66B 5/005 250/353
2016/0033334 A1 * 2/2016 Zhevelev ............... G08B 13/19 250/349
2019/0094358 A1 * 3/2019 Wos ....................... B66B 5/0031
2019/0322485 A1 * 10/2019 Kattainen ............. B66B 5/0056
2020/0039784 A1 * 2/2020 Oggianu ................. B66B 5/005
2020/0130999 A1 * 4/2020 Sun ....................... B66B 5/0062

* cited by examiner

*Primary Examiner* — Michael A Riegelman
(74) *Attorney, Agent, or Firm* — CANTOR COLBURN LLP

(57) ABSTRACT

A safety net system is provided for an elevator system that includes an elevator pit. The safety net system includes a sensor and a processor. The sensor is arranged in a plane along a bottom of the elevator pit and is configured to perform sensing to sense an object disposed along the plane and to generate data corresponding to results of the sensing. The processor is operably coupled to the sensor and is configured to analyze the data and to determine whether the data is indicative of a person in the elevator pit based on analysis results.

16 Claims, 10 Drawing Sheets

600

ELEVATOR PIT SAFETY NET SYSTEM

BACKGROUND

The present disclosure relates to elevator systems and, in particular, to an elevator pit safety net system of an elevator system.

In an elevator system, a hoistway is built into a building and an elevator car travels up and down along the hoistway to arrive at landing doors of different floors of the building. The movement of the elevator is driven by a machine that is controlled by a controller according to instructions received from users of the elevator system. An elevator pit is the space between the hoistway's lowest landing door and the ground at the bottom of the hoistway. The elevator pit typically includes a concrete base slab and certain mechanisms of the elevator system and is typically bordered by four walls. The elevator pit can be accessed by authorized personnel (i.e., a service technician) via a pit ladder. The elevator car should generally be removed from the elevator pit and the elevator system should be non-operative while anyone is accessing the elevator pit, although there are some maintenance procedures requiring the elevator car to be moved while a mechanic is in the elevator pit.

SUMMARY

According to an aspect of the disclosure, a safety net system is provided for an elevator system that includes an elevator pit. The safety net system includes a sensor and a processor. The sensor is arranged in a plane along a bottom of the elevator pit and is configured to perform sensing to sense an object disposed along the plane and to generate data corresponding to results of the sensing. The processor is operably coupled to the sensor and is configured to analyze the data and to determine whether the data is indicative of a person in the elevator pit based on analysis results.

In accordance with additional or alternative embodiments, the sensor is a LiDAR sensor.

In accordance with additional or alternative embodiments, the sensor is a millimeter waver RADAR sensor.

In accordance with additional or alternative embodiments, the sensor is an RGBD camera.

In accordance with additional or alternative embodiments, the sensor is one of a LiDAR sensor, a RADAR sensor or a camera.

In accordance with additional or alternative embodiments, the sensor is disposed in a corner of the elevator pit and is configured to sense a two-dimensional (2D) plane extending away from the corner along the bottom of the elevator pit.

In accordance with additional or alternative embodiments, one or more additional sensors are arranged in the plane and are configured to perform sensing to sense the object and to generate additional data corresponding to results of the sensing. The one or more additional sensors are disposed in one or more other corners of the elevator pit and are oriented transversely with respect to the sensor. The processor is operably coupled to the sensor and the one or more additional sensors and is configured to analyze the data generated by the sensor and the additional data generated by the one or more additional sensors and to determine whether the data and the additional data is indicative of a person in the elevator pit based on analysis results.

In accordance with additional or alternative embodiments, at least one of the one or more additional sensors are non-coplanar with respect to the sensor.

In accordance with additional or alternative embodiments, the sensor is configured to generate point cloud data from one or more sensing operations and the processor is configured to analyze the point cloud data from the one or more sensing operations and to determine whether the point cloud data from the one or more sensing operations is indicative of the person in the elevator pit.

According to an aspect of the disclosure, an elevator system is provided and includes an elevator pit and a safety net system. The safety net system includes a sensor and a processor. The sensor is arranged in a plane along a bottom of the elevator pit and is configured to perform sensing to sense an object disposed along the plane and to generate data corresponding to results of the sensing. The processor is operably coupled to the sensor and is configured to analyze the data and to determine whether the data is indicative of a person in the elevator pit based on analysis results.

In accordance with additional or alternative embodiments, the sensor is a LiDAR sensor.

In accordance with additional or alternative embodiments, the sensor is a millimeter waver RADAR sensor.

In accordance with additional or alternative embodiments, the sensor is an RGBD camera.

In accordance with additional or alternative embodiments, the sensor is one of a LiDAR sensor, a RADAR sensor or a camera.

In accordance with additional or alternative embodiments, the sensor is disposed in a corner of the elevator pit and is configured to sense a two-dimensional (2D) plane extending away from the corner along the bottom of the elevator pit.

In accordance with additional or alternative embodiments, one or more additional sensors are arranged in the plane and are configured to perform sensing to sense the object and to generate additional data corresponding to results of the sensing. The one or more additional sensors are disposed in one or more other corners of the elevator pit and are oriented transversely with respect to the sensor. The processor is operably coupled to the sensor and the one or more additional sensors and is configured to analyze the data generated by the sensor and the additional data generated by the one or more additional sensors and to determine whether the data and the additional data is indicative of a person in the elevator pit based on analysis results.

In accordance with additional or alternative embodiments, at least one of the one or more additional sensors are non-coplanar with respect to the sensor.

In accordance with additional or alternative embodiments, the sensor is configured to generate point cloud data from one or more sensing operations and the processor is configured to analyze the point cloud data from the one or more sensing operations and to determine whether the point cloud data from the one or more sensing operations is indicative of the person in the elevator pit.

According to an aspect of the disclosure, a method of operating a safety net system of an elevator system is provided. The method includes sensing in at least one direction along a plane defined along a bottom of an elevator pit for an object disposed along the plane, generating data corresponding to results of the sensing, analyzing the data and determining whether the data is indicative of a person standing in the bottom of the elevator pit based on results of the analyzing.

In accordance with additional or alternative embodiments, the determining includes an execution of a machine-learning algorithm that improves an accuracy of the determining over time.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
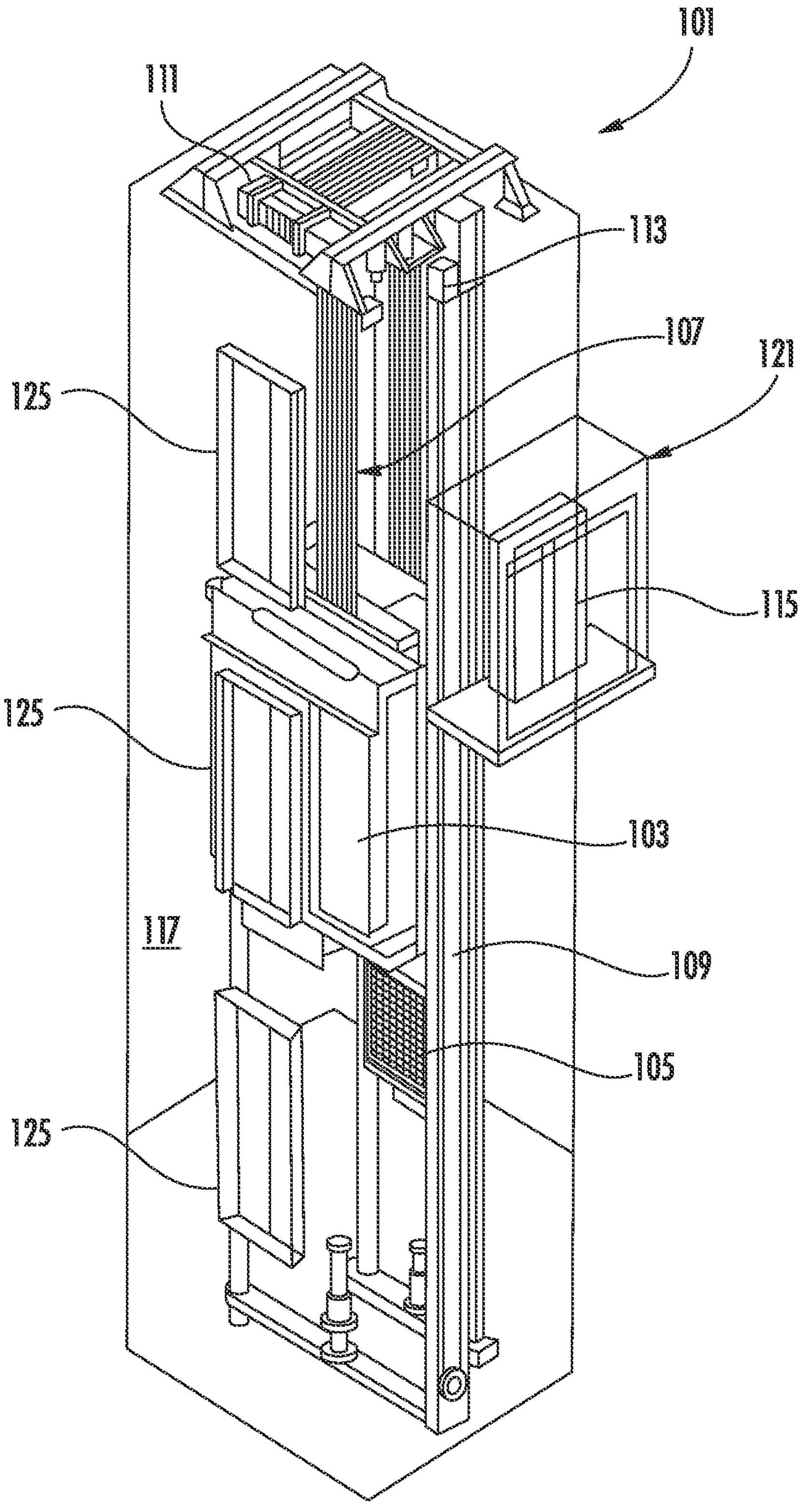
FIG. 1 is a perspective view of an elevator system in accordance with embodiments.

In the elevator industry, multiple monitors and sensors are provided to monitor various parts and components of an elevator system. Particularly, critical areas to monitor are the elevator pit, which service technicians and mechanics enter to perform maintenance and service tasks, and the pit ladder, which service technicians and mechanics use to access the elevator pit and to stand on during some operations. A cost-effective way of detecting a person, such as a service technician or a mechanic, standing in the elevator pit or on the pit ladder of an elevator system is therefore needed. Such a detection system needs to be easy to install and adjust and needs to require minimal service and maintenance. The detection system must also have high detection performance with low false positive and negative outcomes. In addition, when a detection system is installed, it is important that there be a verification process in place to ensure the detection system is operating properly and can be trusted to detect service technicians and mechanics in hazardous locations in the elevator pit and on the pit ladder. This verification process should be simple to initiate and use and effective to thereby provide installation personnel adequate data to allow them to confidently turn over the detection system.

As will be described below, a safety net system is provided for use with an elevator system. The safety net system includes a sensor, such as a single LiDAR sensor, which is located on a back side of the pit ladder to monitor a single plane behind the pit ladder using two-dimensional (2D) sensing. The space behind the pit ladder is mandated to be free of obstructions to allow the service technician's or mechanic's foot to have adequate space. The sensed plane spans an entire length of the pit ladder approximately 50-100 mm behind the ladder rungs and across the full width of the ladder. The toe of the service technician's or mechanic's boots would be easily captured in the point cloud of the sensor (i.e., the LiDAR sensor) and data processing of the point cloud could identify the points and trigger the detection condition indicating that someone is standing on the pit ladder. Additionally or alternatively, the safety net system can include a sensor, such as a single LiDAR sensor, which is located in a corner of the elevator pit to monitor the elevator pit using a 90-degree field of view in a single 2D plane about 18-24" above the floor. As above, a service technician's or mechanic's body would be easily captured in the point cloud of the sensor (i.e., the LiDAR sensor) and data processing of the point cloud could identify the points and trigger the detection condition indicating that someone is standing in the elevator pit. Multiple sensors for each case can be used.

In an operation of the safety net system, a learned profile is generated by analyzing statistical variations and trends in range vs. angle data of the sensor results. After this learning phase, the LiDAR sensor scans the region at an update rate (e.g., 10 scans/second) and compares its current data with the learned background data. Hit points that differ from the learned background data are deemed as potential indicators of persons. This type of algorithm is referred to as a 2D classifying approach and will trigger human detection actions based on the number of observed hit points.

With reference to FIG. 1, which is a perspective view of an elevator system 101, the elevator system 101 includes an elevator car 103, a counterweight 105, a tension member 107, a guide rail 109, a machine 111, a position reference system 113 and a controller 115. The elevator car 103 and the counterweight 105 are connected to each other by the tension member 107. The tension member 107 may include or be configured as, for example, ropes, steel cables and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counterweight, as known in the art. For example, without limitation, the position reference system 113 can be an encoder, sensor, or other system and can include velocity sensing, absolute position sensing, etc., as will be appreciated by those of skill in the art.

The controller 115 may be located, as shown, in a controller room 121 of the elevator shaft 117 and is configured to control the operation of the elevator system 101, and particularly the elevator car 103. It is to be appreciated that the controller 115 need not be in the controller room 121 but may be in the hoistway or other location in the elevator system. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller 115 may be located remotely or in a distributed computing network (e.g., cloud computing architecture). The controller 115 may be implemented using a processor-based machine, such as a personal computer, server, distributed computing network, etc.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

The elevator system 101 also includes one or more elevator doors 104. The elevator door 104 may be integrally attached to the elevator car 103 or the elevator door 104 may be located on a landing 125 of the elevator system 101, or both. Embodiments disclosed herein may be applicable to both an elevator door 104 integrally attached to the elevator car 103 or an elevator door 104 located on a landing 125 of the elevator system 101, or both. The elevator door 104 opens to allow passengers to enter and exit the elevator car 103.

With continued reference to FIG. 1 and with additional reference to FIG. 2, a bottom portion of the elevator shaft 117 of elevator system 101, which is below the lowest one of the landings 125, is provided as an elevator pit 201. The elevator pit 201 can include a base 202, four surrounding elevator pit walls 203, a base part 204, which can include or be provided as a slab and one or more components 2041 that are provided for supporting an elevator car 103, and an elevator pit ladder 205. The elevator pit ladder 205 extends from an upper portion of the elevator pit 201 to a lower portion of the elevator pit 201 and allows a service technician or mechanic (hereinafter referred to as a "mechanic") to access the elevator pit 201. The elevator pit ladder 205 is adjacent to one of the elevator pit walls 203 and includes vertical members 2051, 2052 and rungs 2053 extending between the vertical members 2051, 2052. When a mechanic is inside the elevator pit 201 or standing on the elevator pit ladder 205 (i.e., standing on one of the rungs 2053 of the elevator pit ladder 205), the elevator car 103 should typically be removed from the elevator pit 201 and generally prevented from entering the elevator pit 201 except in cases of certain maintenance procedures.

Figure 2:
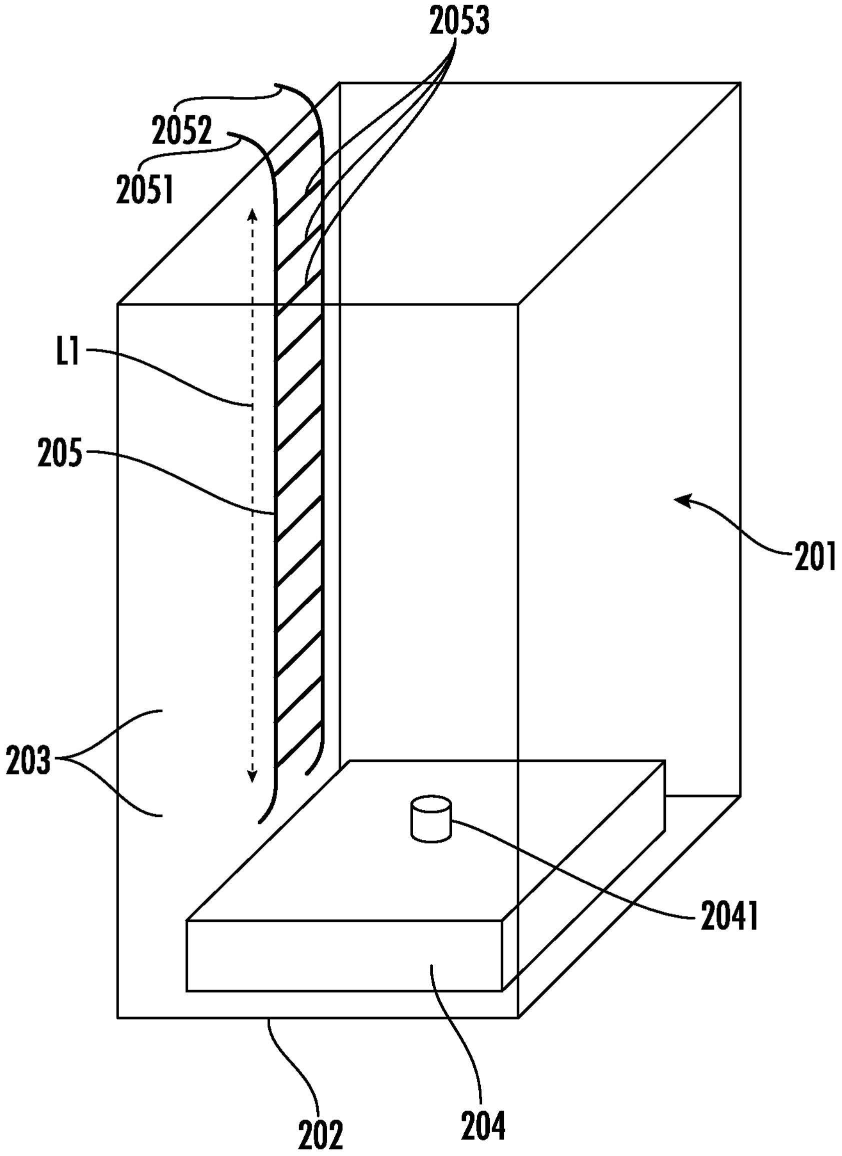
FIG. 2 is a perspective view of an elevator pit of the elevator system of FIG. 1 in accordance with embodiments.
Figure 3:
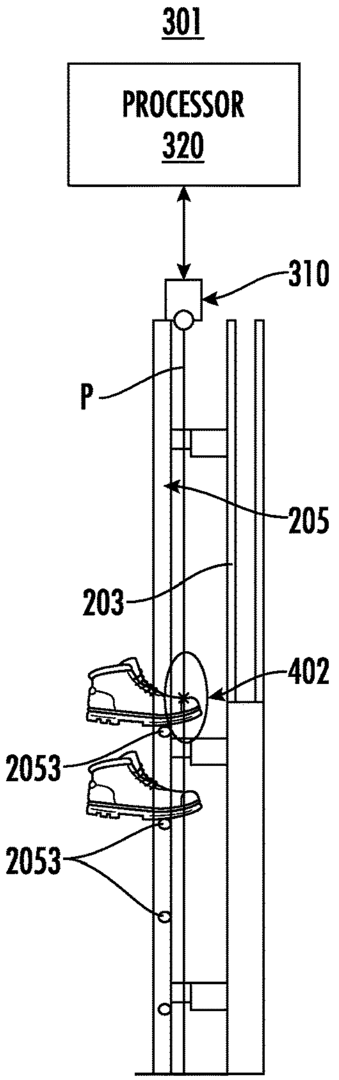
FIG. 3 is a side view of an elevator pit ladder with a sensor of a safety net system in accordance with embodiments.
Figure 4:
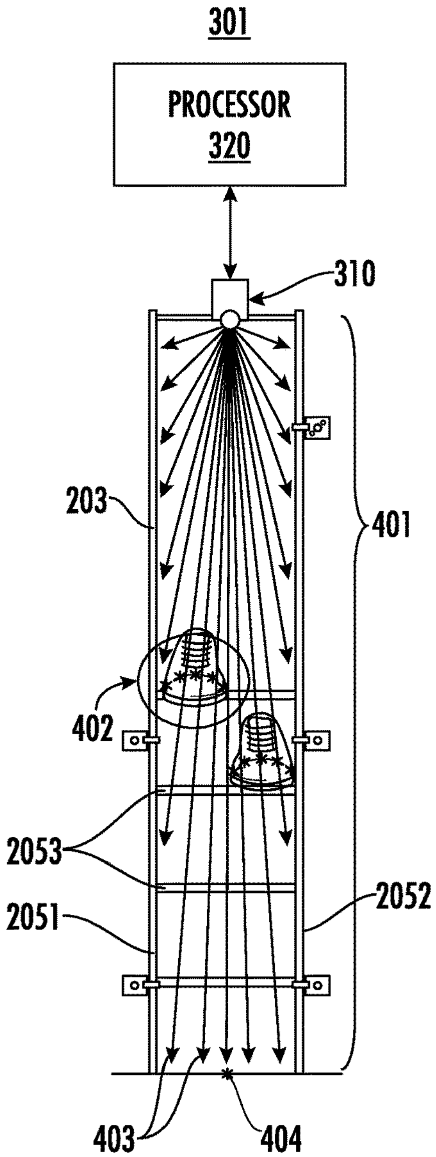
FIG. 4 is an elevation view of the elevator pit ladder with the sensor of FIG. 3 in accordance with embodiments.
Figure 5:
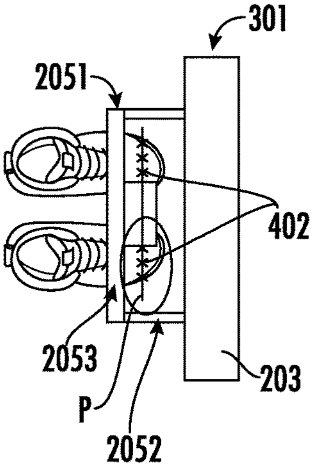
FIG. 5 is a top-down view of the elevator pit ladder with the sensor of FIG. 3 in accordance with embodiments.

With continued reference to FIGS. 1 and 2 and with additional reference to FIGS. 3-5, a safety net system 301 is provided to reliably identify whether a mechanic or another person is standing or supported on the elevator pit ladder 205 in the elevator pit 201 so that appropriate action can be taken to insure safety. The safety net system 301 includes a sensor 310 and a processor 320. The sensor 310 is arranged in a plane P defined between the elevator pit ladder 205 and the one of the elevator pit walls 203. The sensor 310 is configured to perform sensing to sense an object, which is disposed along the plane P, and to generate data corresponding to results of the sensing. The processor 320 is operably coupled to the sensor 310 and is configured to analyze the data and to determine whether the data is indicative of a person standing on the ladder based on analysis results.

The processor 320 includes a processing unit, a memory and an input/output (I/O) unit by which the processor 320 is communicative with the sensor 310 and at least the controller 115 (see FIG. 1). The memory has executable instructions stored thereon, which are readable and executable by the processing unit. When the processing unit reads and executes the executable instructions, the executable instructions cause the processor to operate as described herein. In accordance with embodiments, the executable instructions may include a machine-learning algorithm, which improves certain operations of the processing unit over time. The processor 320 can be remote from the sensor 310 or local. In the former case, the processor 320 can be operably coupled to the sensor 310 via a wired connection or via a wireless connection. In the latter case, the processor 320 can be built into the sensor 310 or provided as a separate component from the sensor 310 and operably coupled to the sensor 310 via a wired connection or via a wireless connection.

In accordance with embodiments, the sensor 310 can include or be provided as one or more of a light detection and ranging or a laser imaging, detection, and ranging (LiDAR) sensor, a radio detection and ranging (RADAR) sensor and/or a camera. In accordance with further embodiments, the sensor 310 can be provided as one or more of a 2D LiDAR sensor, a millimeter wave RADAR sensor and/or a red, green, blue, depth (RGBD) camera. In accordance with still further embodiments, the sensor 310 can be provided as plural sensors including a combination of one or more sensor types listed herein.

In the exemplary case of the sensor 310 being a 2D LiDAR sensor, the sensor 310 is configured to sense the plane P as a 2D plane along an entire length L1 (see FIG. 2) of the elevator pit ladder 205, where the plane P can be about 50-100 mm behind the elevator pit ladder 205 and between the elevator pit ladder 205 and the one of the elevator pit walls 203. In these or other cases, the sensor 310 is configured to generate the data as point cloud data 401 (see FIG. 4) using a single scan for image processing, multiple scans for image processing and/or multiple successive or continuous scans for video processing and the processor 320 is configured to analyze the point cloud data 401 and to determine whether the point cloud data 401 is indicative of the person standing on the elevator pit ladder 205.

That is, where the elevator pit ladder 205 includes rungs 2053, the object being sensed or detected can be a toe of a shoe of a person standing on one of the rungs 2053, the point cloud data 401 can include hit points 402 at which different parts of the toe of the shoe intersects the plane P, additional points 403 at which no portion of any object intersects the plane P and false points 404 at which portions of foreign objects or debris (i.e., a feather or dust floating into the plane P) intersect the plane P. The processor 320 analyzes each of the hit points 402, the additional points 403 and the false points 404. The processor 320 identifies the hit points 402 as hit points 402 from their characteristic shape and their grouping, the processor 320 identifies the additional points 403 as additional points 403 from their signal match to a baseline data set taken when the elevator pit 201 is known to be empty or, more generally, to have certain physical characteristics, and the processor 320 identifies the false points 404 as false points 404 from their characteristic shapes or lack thereof and their grouping or lack thereof. The processor 320 then distinguishes the hit points 402 from the additional points 403 and the false points 404 and determines that, when the hit points 402 of the point cloud data 401 are identified and distinguished, the hit points 402 are indicative of the toe of the shoe intersecting the plane P and thus that a person is likely to be standing on one of the rungs 2053 of the elevator pit ladder 205. The processor 320 can then communicate that finding with at least the controller 115 of the elevator system 101 so that the controller 115 can act, such as by preventing the elevator car 103 from entering the elevator pit 201.

Since the processor 320 can identify and distinguish the hit points 402 from the additional points 403, an incidence of false negative determinations of the safety net system 301 is reduced. Likewise, since the processor 320 can identify and distinguish the hit points 402 from the false points 404, an incidence of false positive determinations of the safety net system 301 is also reduced. When the executable instructions stored on the memory unit of the processor 320 include a machine-learning algorithm, the ability of the processor 320 to identify and distinguish the hit points 402 from the additional points 403 and the false points 404 can improve over time and the incidence of the false negative and false positive determinations of the safety net system 301 can be continually reduced over time in a corresponding manner.

Figure 6:
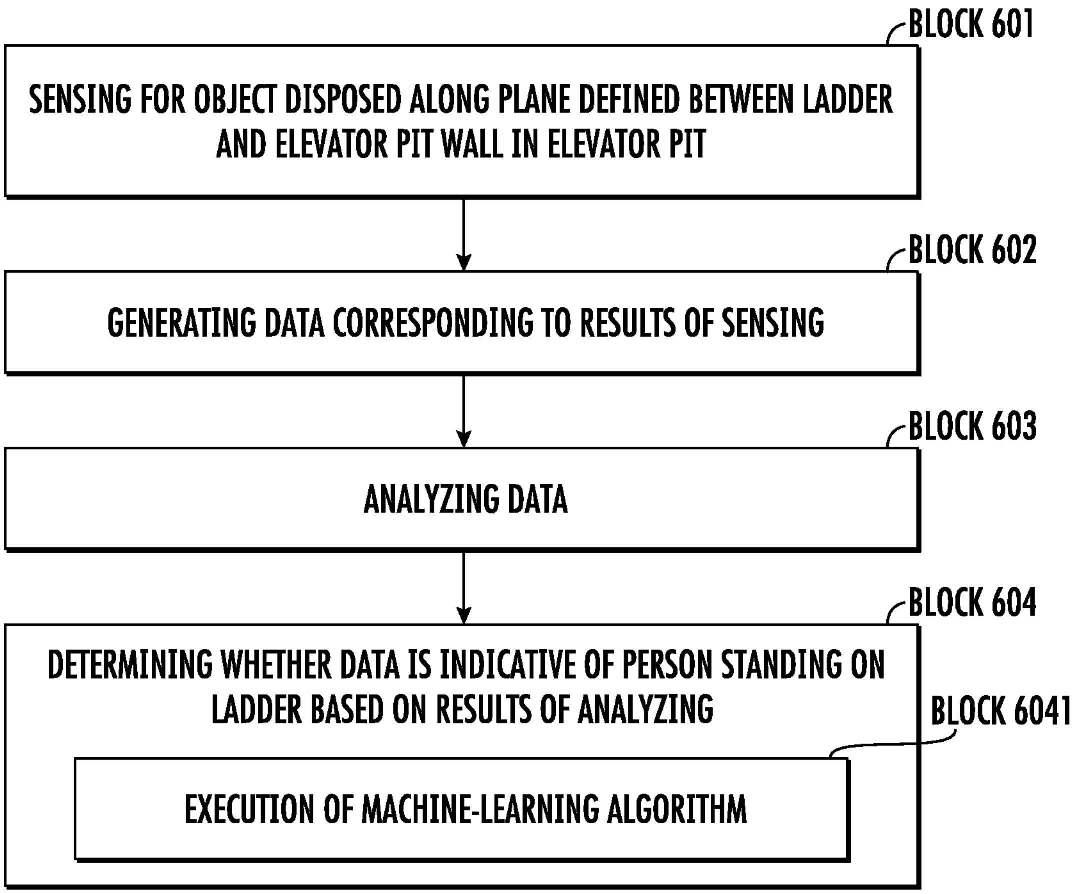
FIG. 6 is a flow diagram illustrating a method of operating a safety net system of an elevator system in accordance with embodiments.

With reference to FIG. 6, a method 600 of operating a safety net system of an elevator system, such as the safety net system 301 of the elevator system 101 described above, is provided. The method 600 includes sensing for an object disposed along a plane defined between a ladder and an elevator pit wall in an elevator pit (block 601), generating data corresponding to results of the sensing (block 602), analyzing the data (block 603) and determining whether the data is indicative of a person standing on the ladder based on results of the analyzing (block 604). As described above, the object can be a toe of a shoe of a person standing on a rung of the ladder and the determining of block 604 can include an execution of a machine-learning algorithm (block 6041) that improves an accuracy of the determining over time.

While the image processing described above relates to a single frame of points in a single scan point cloud, the processor 320 can also process successive scans to help classify points as hit points 402 versus additional points 403 or false points 404 by determining how persistent the points are and if they are moving together as one would expect in valid hit points associated with mechanics. As such, the generating of the data of block 602 could include generating data of multiple scans of point clouds, where the term "data" can relate to a continuously or semi-continuously updated set of point cloud scans. In these or other cases, the analyzing of block 603 and the determining of block 604 can include image processing and video processing.

Figure 7:
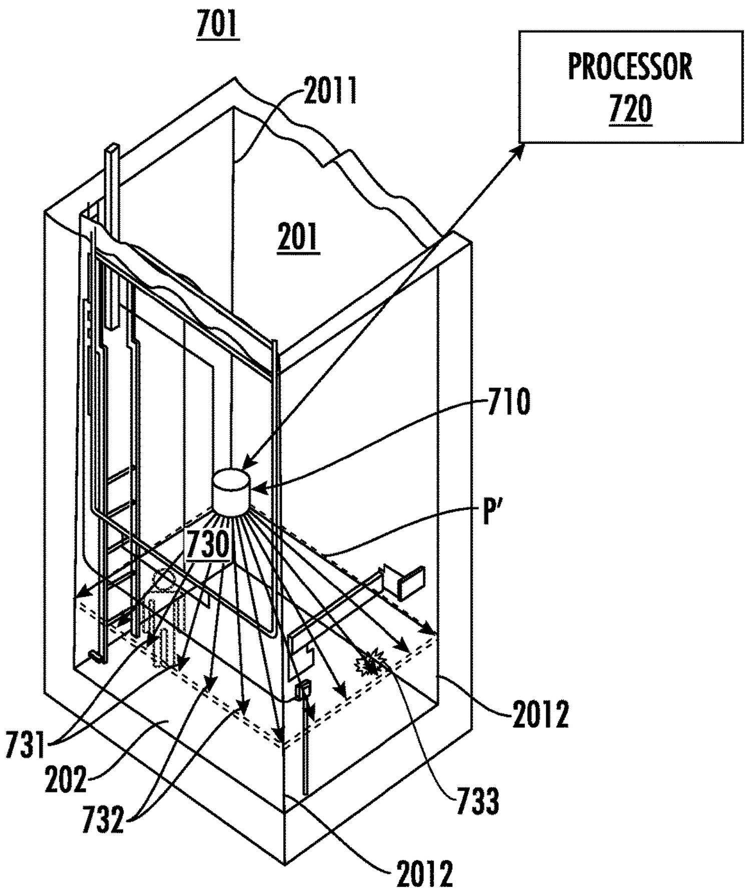
FIG. 7 is a perspective view of an elevator pit with a sensor of a safety net system in accordance with embodiments.

With reference back to FIGS. 1 and 2 and with additional reference to FIG. 7, a safety net system 701 is provided to reliably identify whether a mechanic or another person is standing in the elevator pit 201 so that appropriate action can be taken to insure safety. The safety net system 701 includes a sensor 710 and a processor 720. The sensor 710 is arranged in a plane P' defined along a bottom of the elevator pit 201. The sensor 710 is configured to perform sensing to sense an object, which is disposed along the plane P', and to generate data corresponding to results of the sensing. The processor 720 is operably coupled to the sensor 710 and is configured to analyze the data and to determine whether the data is indicative of a person in the elevator pit 201 based on analysis results.

The processor 720 includes a processing unit, a memory and an input/output (I/O) unit by which the processor 720 is communicative with the sensor 710 and at least the controller 115 (see FIG. 1). The memory has executable instructions stored thereon, which are readable and executable by the processing unit. When the processing unit reads and executes the executable instructions, the executable instructions cause the processor to operate as described herein. In accordance with embodiments, the executable instructions may include a machine-learning algorithm, which improves certain operations of the processing unit over time. The processor 720 can be remote from the sensor 710 or local. In the former case, the processor 720 can be operably coupled to the sensor 710 via a wired connection or via a wireless connection. In the latter case, the processor 720 can be built into the sensor 710 or provided as a separate component from the sensor 710 and operably coupled to the sensor 710 via a wired connection or via a wireless connection.

In accordance with embodiments, the sensor 710 can include or be provided as one or more of a light detection and ranging or a laser imaging, detection, and ranging (LiDAR) sensor, a radio detection and ranging (RADAR) sensor and/or a camera. In accordance with further embodiments, the sensor 710 can be provided as one or more of a 2D LiDAR sensor, a millimeter wave RADAR sensor and/or a red, green, blue, depth (RGBD) camera. In accordance with still further embodiments, the sensor 710 can be provided as plural sensors including a combination of one or more sensor types listed herein. A description of plural sensors will be provided below.

In the exemplary case of the sensor 710 being a 2D LiDAR sensor, the sensor 710 is disposed in a corner 2011 of the elevator pit 201 and is configured to sense the plane P' as a 2D plane extending away from the corner 2011 along a substantial portion of the area of the bottom of the elevator pit 201. The plane P' can be about 18-24" above the base 202. In these or other cases, the sensor 710 is configured to generate the data as point cloud data 730 using a single scan for image processing, multiple scans for image processing and/or multiple successive or continuous scans for video processing and the processor 720 is configured to analyze the point cloud data 730 and to determine whether the point cloud data 730 is indicative of the person in the elevator pit 201.

That is, the object being sensed or detected can be a person in the elevator pit 201 and the point cloud data 730 can include hit points 731 at which different parts of the person intersect the plane P', additional points 732 at which no portion of the person or other object intersects the plane P' and false points 733 at which portions of foreign objects or debris (i.e., a feather or dust floating into the plane P') intersect the plane P'. The processor 720 analyzes each of the hit points 731, the additional points 732 and the false points 733. The processor 720 identifies the hit points 731 as hit points 731 from their characteristic shape and their grouping, the processor 720 identifies the additional points 732 as additional points 732 from their signal match to a baseline data set taken when the elevator pit 201 is known to be empty or, more generally, to have certain physical characteristics, and the processor 720 identifies the false points 733 as false points 733 from their characteristic shapes or lack thereof and their grouping or lack thereof. The processor 720 then distinguishes the hit points 731 from the additional points 732 and the false points 733 and determines that, when the hit points 731 of the point cloud data 730 are identified and distinguished, the hit points 731 are indicative of the portion of the person intersecting the plane P' and thus that a person is likely to be standing in the elevator pit 201. The processor 720 can then communicate that finding with at least the controller 115 of the elevator system 101 so that the controller 115 can act, such as by preventing the elevator car 103 from entering the elevator pit 201, to avoid an unsafe condition.

Since the processor 720 can identify and distinguish the hit points 731 from the additional points 732, an incidence of false negative determinations of the safety net system 701 is reduced. Likewise, since the processor 720 can identify and distinguish the hit points 731 from the false points 733, an incidence of false positive determinations of the safety net system 701 is also reduced. When the executable instructions stored on the memory unit of the processor 720 include a machine-learning algorithm, the ability of the processor 720 to identify and distinguish the hit points 731 from the additional points 732 and the false points 733 can improve over time and the incidence of the false negative and false positive determinations of the safety net system 701 can be continually reduced over time in a corresponding manner.

Figure 8:
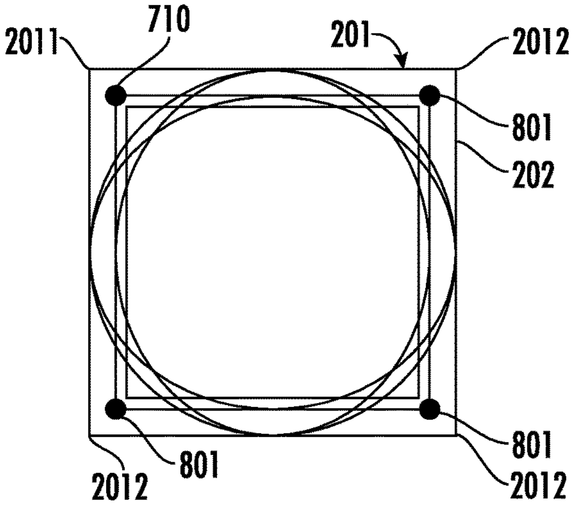
FIG. 8 is a top-down view of an elevator pit with a sensor and additional sensors of a safety net system in accordance with embodiments.
Figure 9:
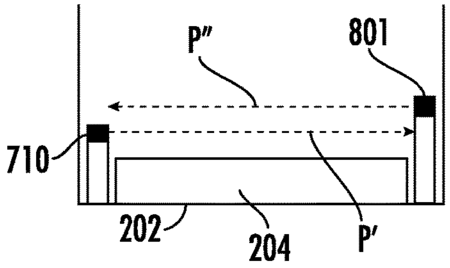
FIG. 9 is a side view of an elevator pit with a sensor and additional sensors, which are non-coplanar, of a safety net system in accordance with embodiments.

With reference to FIGS. 8 and 9 and in accordance with embodiments, one or more additional sensors 801 can be arranged in the plane P' and configured to perform sensing to sense the object and to generate additional data corresponding to results of the sensing. In these or other cases, as shown in FIG. 8, the sensor 710 can be disposed in the corner 2011 of the elevator pit 201 and the one or more additional sensors 801 can be disposed in one or more other corners 2012 of the elevator pit 201 and can be oriented transversely with respect to the sensor 710. The processor 720 would be operably coupled to the sensor 710 and the one or more additional sensors 801 and would be configured to analyze the data generated by the sensor 710 and the additional data generated by the one or more additional sensors 801 and to determine whether the data and the additional data is indicative of a person in the elevator pit 201 based on analysis results. As shown in FIG. 9, at least one of the one or more additional sensors 801 is disposed in a unique plane P" and is non-coplanar with respect to the sensor 710.

Figure 10:
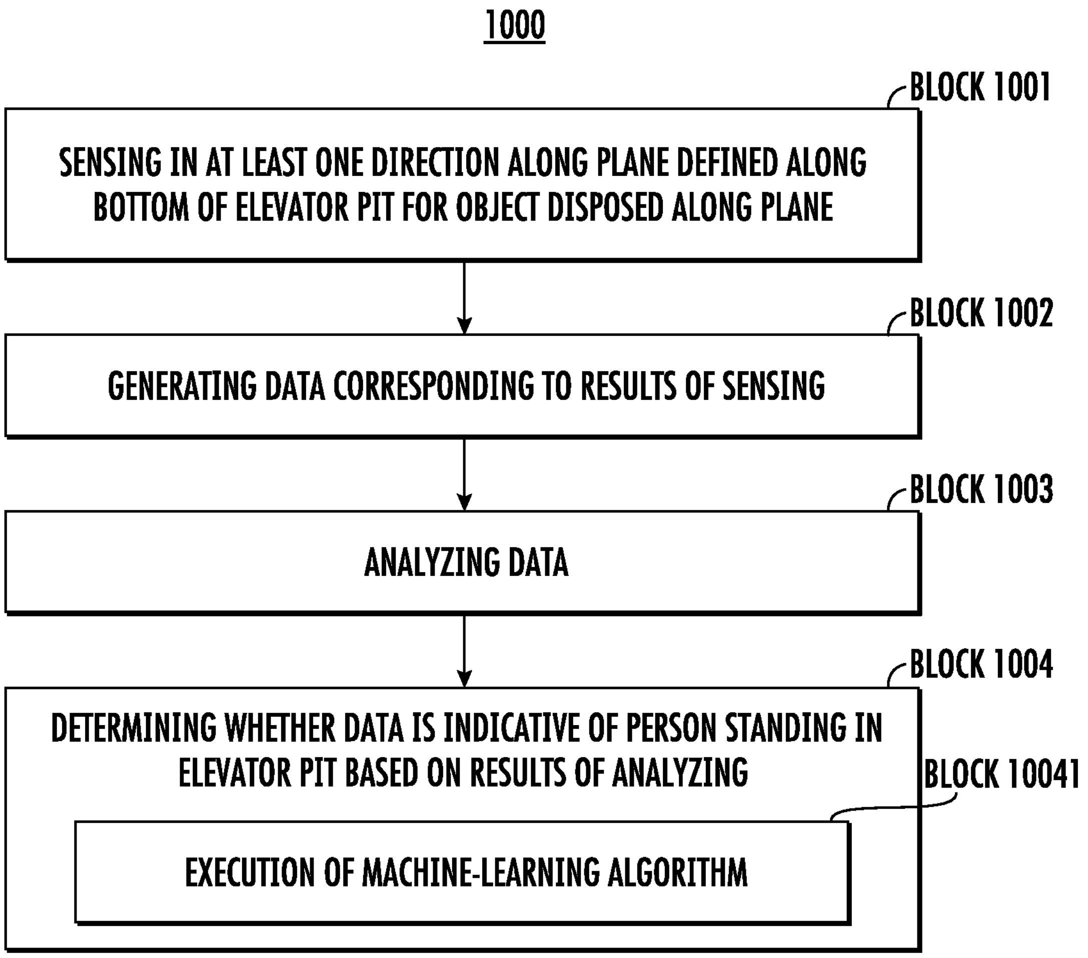
FIG. 10 is a flow diagram illustrating a method of operating a safety net system of an elevator system in accordance with embodiments.

With reference to FIG. 10, a method 1000 of operating a safety net system of an elevator system, such as the safety net system 701 of the elevator system 101 described above, is provided. The method 1000 includes sensing in at least one direction along a plane defined along a bottom of an elevator pit for an object disposed along the plane (block 1001), generating data corresponding to results of the sensing (block 1002), analyzing the data (block 1003) and determining whether the data is indicative of a person standing in the elevator pit based on results of the analyzing (block 1004). As described above, the determining of block 1004 can include an execution of a machine-learning algorithm (block 10041) that improves an accuracy of the determining over time.

While the image processing described above relates to a single frame of points in a single scan point cloud, the processor 720 can also process successive scans to help classify points as hit points 731 versus additional points 732 or false points 733 by determining how persistent the points are and if they are moving together as one would expect in valid hit points associated with mechanics. As such, the generating of the data of block 1002 could include generating data of multiple scans of point clouds, where the term "data" can relate to a continuously or semi-continuously updated set of point cloud scans. In these or other cases, the analyzing of block 1003 and the determining of block 1004 can include image processing and video processing While the embodiments of FIGS. 3-6 and the embodiments of FIGS. 7-10 are described above as being separate from one another, it is to be understood that this is not required and that the embodiments of FIGS. 3-6 and the embodiments of FIGS. 7-10 can be combined in various combinations. For example, sensor 310 can be provided as a single 2D LiDAR sensor with a field of view that captures a front area of an elevator pit a mechanic must go through to enter the elevator pit and sensor 710 can be provided as a set of two 2D LiDAR sensors in opposite corners of a pit area with fields of views that capture most or all of the areas the mechanic might stand in the elevator pit. Additional sensing in these or other cases can include three-dimensional (3D) sensing, alternate sensing (mmWave or RGB-D cameras), two or more sensors, coverage of different plans with 2D sensors and ranges of data/image processing approaches, including but not limited to image classification, machine learning, pattern recognition, etc.

Figure 11:
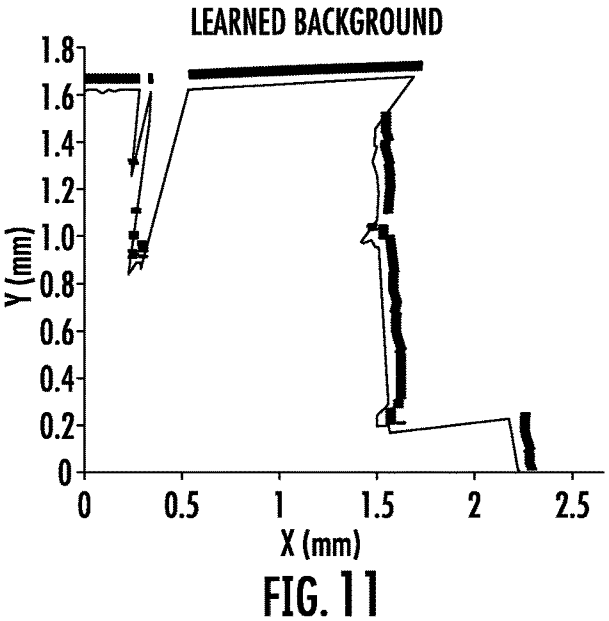
FIG. 11 is a graphical illustration of a learned background of a safety net system in accordance with embodiments.
Figure 12:
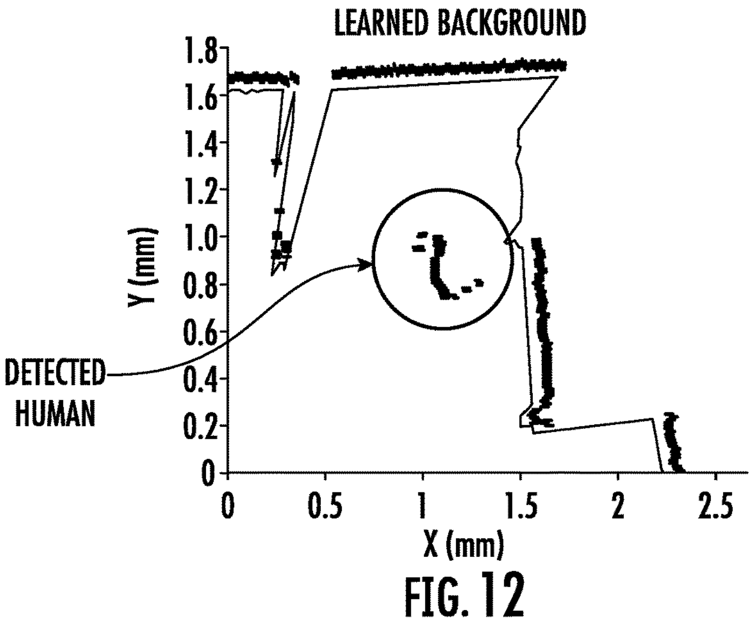
FIG. 12 is a graphical illustration of a person imposed on a learned background of a safety net system in accordance with embodiments.

With reference to FIGS. 11 and 12, an operational method of the sensor 310 and the sensor 710 can be a 2D classifying approach. This 2D classifying approach will be described in the context of sensor 710. This is being done for purposes of clarity and brevity and it is to be understood that the 2D classifying approach is applicable to sensor 310 as well.

After setup, the sensor 710 learns an ambient background in the elevator pit 201 by scanning for a predefined time (e.g., for about 30 seconds) and with various elevator car positions. A learned profile is then generated by the processor 720 through an analysis of statistical variations and trends in range vs. angle data as shown in FIG. 11. This results in a production of a surveyed area as illustrated in the gray region in FIG. 11. After the learning phase, the sensor 710 scans elevator pit 201 at an updated rate (e.g., about 10 scans/second). The processor 720 then compares the updated data generated by the sensor 710, which is shown as points in the graph of FIG. 11 with the background. Any points inside the grey region are deemed as potential indicators of humans as shown in FIG. 12. A final decision about human detection by the processor 720 is based on a number of points observed in the grey region in each scan and how many scans exceed that trigger level.

The 2D classifying approach can be re-executed periodically or in response to an external event. The periodic re-executions allow for changes in the elevator system 201 over time to be accounted for (i.e., degradations or damages to components, changes in components, etc.). The re-executions in response to an external event can be executed as needed, such as when the sensor 710 is bumped or moved and needs to be recalibrated.

With continued reference to FIG. 11, a typical ambient background of the elevator pit 201 from a learning phase of the safety net system 701 is provided. In FIG. 1, evidence of the counterweight and rails is visible on the right side of the graph and evidence of the car guide rails, especially the left side rail is visible on the left side of the graph. When installation of the safety net system 701 is completed, the processor 720 of the safety net system 701 can provide a calculation of the coverage region area of FIG. 11 (in this case, about 2.65 m2), which can be compared to the dimensions of the elevator pit 201 as a check on the learning phase. In an event the comparison indicates that the coverage region area is close to the dimensions of the elevator pit 201, the learning phase can be deemed successful. Any subsequent deviation from the coverage region area that the safety net system 701 picks up during the operational phase can be identified as a potential person standing in the elevator pit 201. Further processing by the processor 720 can be executed to confirm that the deviation caused by a person whereupon appropriate action can be taken by the processor 720 and the controller 115 of FIG. 1.

Figure 13:
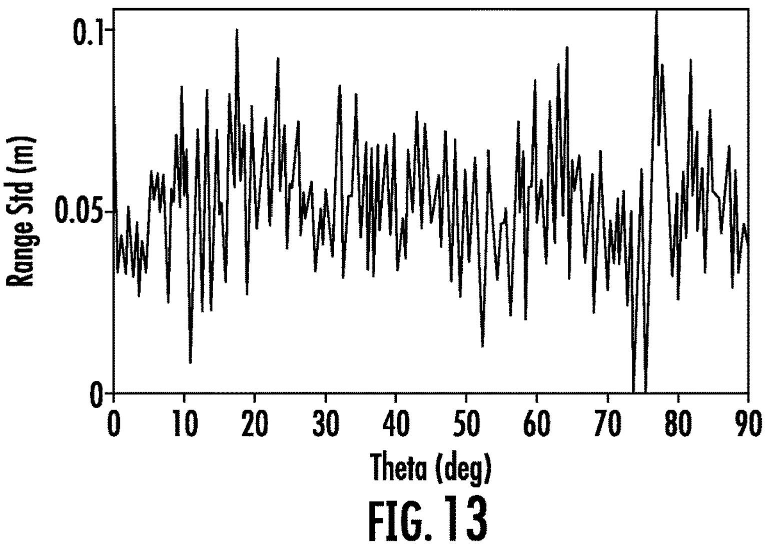
FIG. 13 is a graphical illustration of a signal variance of a sensor reading of a safety net system in accordance with embodiments.

With reference to FIG. 13, a normal variance of range detection at each angle of the sensor 710 can be established during the learning phase and can also be used to verify a successful installation. In this case, excessive variation in the signal of FIG. 13 during the operational phase would by indicative of either that the sensor 710 is failing, or that the elevator pit 201 is not clear. As above, further processing by the processor 720 can be executed to confirm that the deviation caused by a person whereupon appropriate action can be taken by the processor 720 and the controller 115 of FIG. 1.

The variance of multiple collected point clouds for a learning phase (for example, at one vertical car position) could generate a range of acceptance criteria. Examples include: a magnitude of the average variation across all angles in the field of view, a worst-case magnitude variation observed at any angle within the field of view, a drift or variation in point cloud range values at any angle that trends over the scanned learning phase of observed range values or a variation in point cloud signatures that could be traced to rotational variations of the sensor 710 during the learning phase.

As used herein, the term "variance" can be a discriminator for successful learning where there can be two types of data metrics useful for determining whether the learning phase was successful. These include a difference or error between learned results and a pre-determined idea of what is expected, such as an area of a learned background or noted items/objects in the sensor's field of view, and an observed variation in collected data as seen in successive scans which are not linked to any pre-determined idea of what was expected.

The operational methods associated with the graphs of FIGS. 11 (and 12) and 13 will now be described with reference to features that are described in detail above and will not be re-described below.

Figure 14:
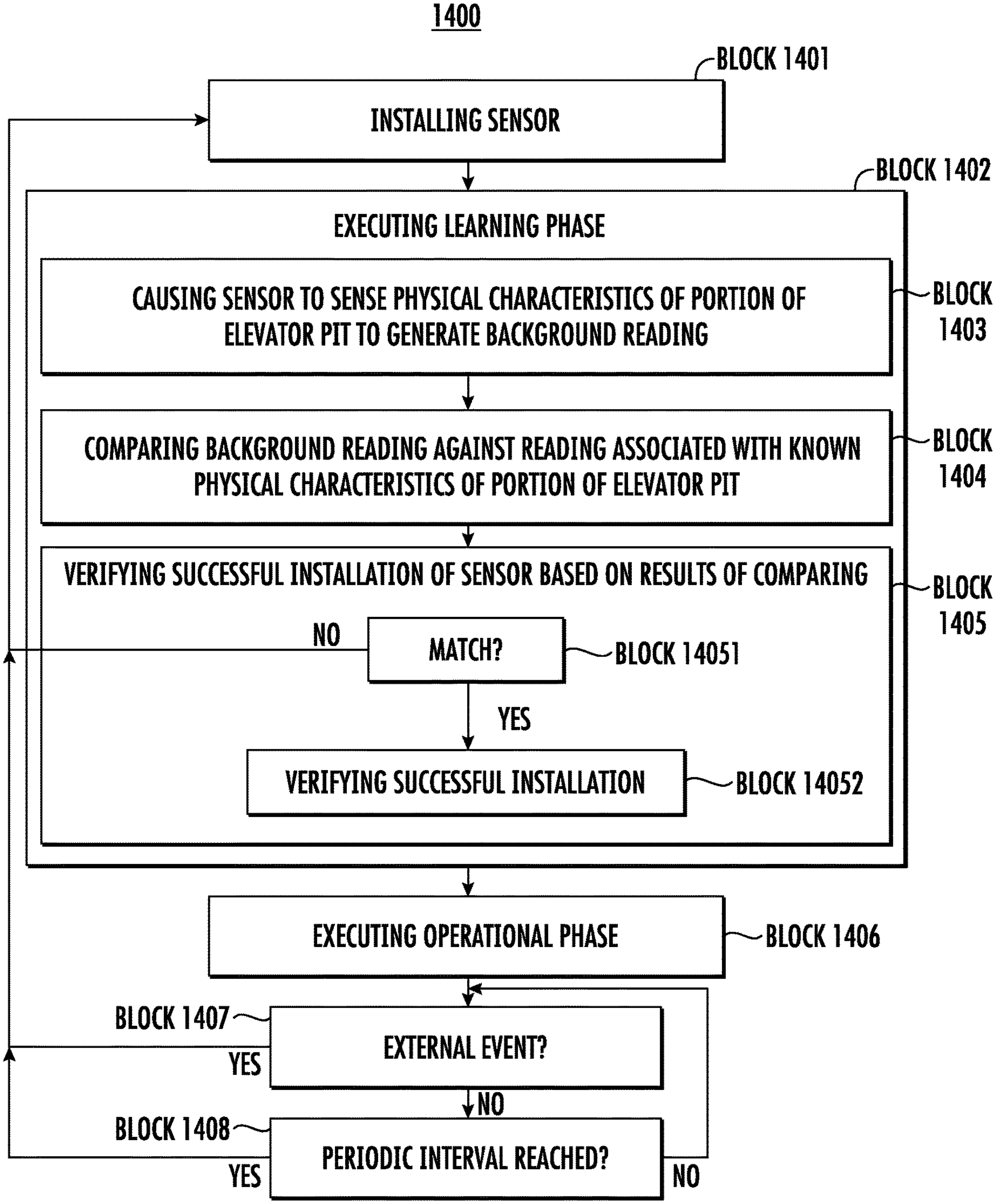
FIG. 14 is a flow diagram illustrating a method of operating a safety net system of an elevator system in accordance with embodiments.

With reference to FIG. 14, a method 1400 of operating a safety net system of an elevator system, such as the safety net system 301 and the safety net system 701 described above, is provided. The method 1400 includes installing a sensor in an elevator pit of the elevator system (block 1401) and executing a learning phase of the sensor to verify successful installation of the sensor (block 1402). The executing of the learning phase of block 1402 includes causing the sensor to sense physical characteristics of a portion of the elevator pit when the elevator pit is known to have certain physical characteristics to generate a background reading (block 1403), comparing the background reading against a reading associated with known physical characteristics of the portion of the elevator pit (block 1404) and verifying the successful installation of the sensor based on results of the comparing (block 1405). The executing of the learning phase of block 1402 can include the notion of learning the background in the elevator pit for various vertical locations of the elevator car which cause various elevator components such as the counterweight, traveling cables, compensation ropes, tie-down compensation, etc., to move into or out of a field of view of the sensor. The portion of the elevator pit can include or be provided as one or more of a plane between a pit ladder of the elevator pit and an adjacent wall of the elevator pit and a plane defined along a bottom of the elevator pit. The method 1400 can also include executing an operational phase of the sensor following the verifying of the successful installation of the sensor (block 1406), periodically repeating the executing of the learning phase (block 1407), especially to the extent that physical characteristics of the elevator pit are known to change (i.e., due to the elevator car occupying different vertical positions as noted above) and/or to change over time (i.e., due to degradation and/or addition or removal of elevator components or supporting mechanical elements), and repeating the executing of the learning phase following an external event (block 1408), such as the sensor being bumped or moved.

In accordance with embodiments, the executing of the learning phase of block 1402 can be commanded via a display unit, which is communicatively coupled with the sensor, and the verifying of the successful installation of the sensor of block 1405 can include displaying an indication on the display unit.

The verifying of the successful installation of the sensor of block 1405 includes determining whether the background reading matches the reading associated with the known physical characteristics to a predefined degree (block 14051) and verifying the successful installation of the sensor in an event the background reading matches the reading associated with the known physical characteristics to the predefined degree (block 14052). Where the known physical characteristics are an area of the portion of the elevator pit, the predefined degree can be a relatively small percentage (i.e., less than about 1-5%) difference between the background reading and the area of the portion of the elevator pit. As shown in FIG. 14, the method 1400 can include reinstalling the sensor as in block 1401 and repeating the executing of the learning phase of block 1402 in an event the background reading does not match the reading associated with the known physical characteristics to the predefined degree.

Figure 15:
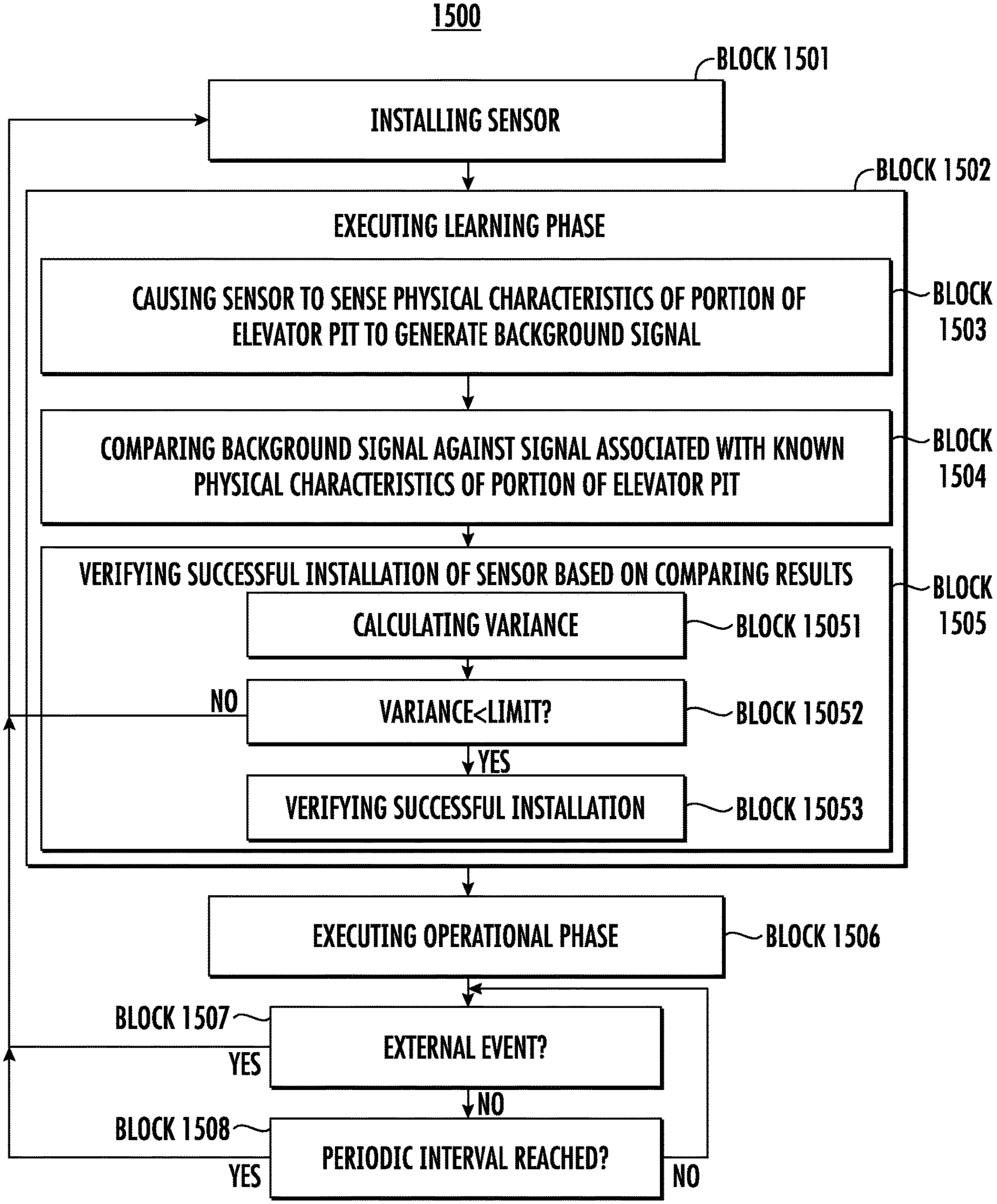
FIG. 15 is a flow diagram illustrating a method of operating a safety net system of an elevator system in accordance with embodiments.

With reference to FIG. 15, a method 1500 of operating a safety net system of an elevator system, such as the safety net system 301 and the safety net system 701 described above, is provided. The method 1500 includes installing a sensor in an elevator pit of the elevator system (block 1501) and executing a learning phase of the sensor to verify successful installation of the sensor (block 1502). The executing of the learning phase of block 1502 includes causing the sensor to sense physical characteristics of a portion of the elevator pit when the elevator pit is known to have certain physical characteristics to generate a background signal (block 1503), comparing the background signal against a signal associated with known physical characteristics of the portion of the elevator pit (block 1504) and verifying the successful installation of the sensor based on results of the comparing (block 1505). The executing of the learning phase of block 1502 can include the notion of learning the background in the elevator pit for various vertical locations of the elevator car which cause various elevator components such as the counterweight, traveling cables, compensation ropes, tie-down compensation, etc., to move into or out of a field of view of the sensor. The portion of the elevator pit can include or be provided as one or more of a plane between a pit ladder of the elevator pit and an adjacent wall of the elevator pit and a plane defined along a bottom of the elevator pit. The method 1500 can also include executing an operational phase of the sensor following the verifying of the successful installation of the sensor (block 1506), periodically repeating the executing of the learning phase (block 1507), especially to the extent that physical characteristics of the elevator pit are known to change (i.e., due to the elevator car occupying different vertical positions as noted above) and/or to change over time (i.e., due to degradation and/or addition or removal of elevator components or supporting mechanical elements), and repeating the executing of the learning phase following an external event (block 1508), such as the sensor being bumped or moved.

In accordance with embodiments, the executing of the learning phase of block 1502 can be commanded via a display unit, which is communicatively coupled with the sensor, and the verifying of the successful installation of the sensor of block 1505 can include displaying an indication on the display unit. The verifying of the successful installation of the sensor of block 1505 includes calculating a variance between the background signal and the signal associated with the known physical characteristics (block 15051), determining whether the variance is less than a predefined limit (block 15052) and verifying the successful installation of the sensor in an event the variance is less than the predefined limit (block 15053). The predefined limit can be some relatively small percentage of variance (i.e., about 1-5%). As shown in FIG. 15, the method 1500 can include reinstalling the sensor as in block 1501 and repeating the executing of the learning phase of block 1502 in an event the background signal does not match the signal associated with the known physical characteristics to the predefined degree.

Figure 16:
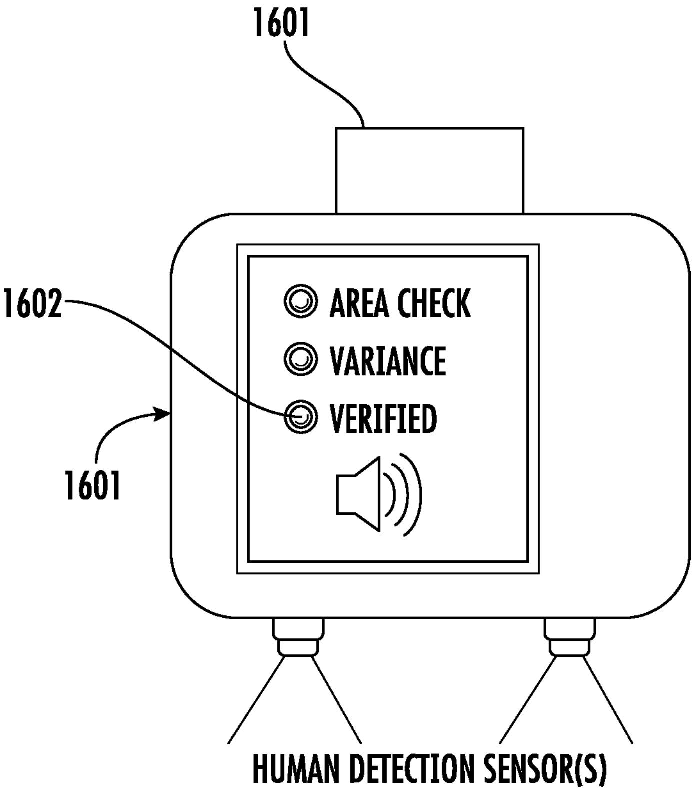
FIG. 16 is a schematic illustration of a display unit of a safety net system in accordance with embodiments.

With reference to FIG. 16, a display unit 1600 of a safety net system of an elevator system, such as the safety net system 301 and the safety net system 701 described above, is provided. The display unit 1600 is communicatively coupled with a sensor (i.e., sensor 310 or sensor 710) and may be provided locally or remotely. In the former case, the display unit 1600 can be wired or wirelessly connected to the sensor and can include a processor (i.e., processor 320 or processor 720). The latter case, the display unit 1600 can be a handheld device or can be a virtual machine of an application running on a computing device. In any case, the display unit 1600 is operable by an operator to execute a method, such as the method 1400 of FIG. 14 or the method 1500 of FIG. 15. As shown in FIG. 16, the display unit 1600 includes an actuator 1601, such as a button or switch, and at least one indicator 1602. The actuator 1601 is actuatable by the operator to initiate the executing of the above-described learning phase. The at least one indicator 1601 is activatable to indicate completion of the verifying. The at least one indicator 1601 may include multiple indicators that sequentially indicate progress of the above-described learning phase so that, in an event of a problem with one of the operations, the operator can be made aware of a type of the problem.

Technical effects and benefits of the present disclosure are the provision of a safety net system for an elevator system that uses a low-cost sensor, such as a LiDAR sensor, to cover a single-angle field of view (azimuth only, no need for elevation angle) in a 2D mode. Data processing and a detection determination is accomplished by a simple yet robust algorithm that could easily be remote or provided on the sensor itself.

The corresponding structures, materials, acts and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A safety net system for an elevator system comprising an elevator pit, the safety net system comprising:

a sensor arranged in a first plane along a bottom of the elevator pit and configured to perform sensing to sense an object disposed along the first plane and to generate data corresponding to results of the sensing;

one or more additional sensors arranged in a second plane, which is non-coplanar with the first plane, along the bottom of the elevator pit and configured to perform sensing to sense an object disposed along the second plane and to generate additional data corresponding to results of the sensing; and a processor operably coupled to the sensor and to the one or more additional sensors and configured to analyze the data and the additional data and to determine whether the data and the additional data is indicative of a person in the elevator pit based on analysis results.

2. The safety net system according to claim 1, wherein the sensor and the one or more additional sensors are LiDAR sensors.

3. The safety net system according to claim 1, wherein the sensor and the one or more additional sensors are millimeter waver RADAR sensors.

4. The safety net system according to claim 1, wherein the sensor and the one or more additional sensors are RGBD cameras.

5. The safety net system according to claim 1, wherein the sensor and the one or more additional sensors are one of LiDAR sensors, RADAR sensors or cameras.

6. The safety net system according to claim 1, wherein the sensor and the one or more additional sensors are is disposed in corners of the elevator pit and are configured to sense two-dimensional (2D) planes extending away from each of the corners along the bottom of the elevator pit.

7. The safety net system according to claim 1, wherein:

the sensor and the one or more additional sensors are each configured to generate point cloud data from one or more sensing operations, and the processor is configured to analyze the point cloud data from the one or more sensing operations and to determine whether the point cloud data from the one or more sensing operations is indicative of the person in the elevator pit.

8. An elevator system, comprising:

an elevator pit; and a safety net system comprising:

a sensor arranged in a first plane along a bottom of the elevator pit and configured to perform sensing to sense an object disposed along the first plane and to generate data corresponding to results of the sensing;

one or more additional sensors arranged in a second plane, which is non-coplanar with the first plane, along the bottom of the elevator pit and configured to perform sensing to sense an object disposed along the second plane and to generate additional data corresponding to results of the sensing; and a processor operably coupled to the sensor and to the one or more additional sensors and configured to analyze the data and to determine whether the data and the additional data is indicative of a person in the elevator pit based on analysis results.

9. The elevator system according to claim 8, wherein the sensor and the one or more additional sensors are LiDAR sensors.

10. The elevator system according to claim 8, wherein the sensor and the one or more additional sensors are a millimeter waver RADAR sensors.

11. The elevator system according to claim 8, wherein the sensor and the one or more additional sensors are RGBD cameras.

12. The elevator system according to claim 8, wherein the sensor and the one or more additional sensors are one of LiDAR sensors, RADAR sensors or cameras.

13. The elevator system according to claim 8, wherein the sensor and the one or more additional sensors are disposed in corners of the elevator pit and are configured to sense two-dimensional (2D) planes extending away from the corners along the bottom of the elevator pit.

14. The elevator system according to claim 8, wherein:

the sensor and the one or more additional sensors are each configured to generate point cloud data from one or more sensing operations, and the processor is configured to analyze the point cloud data from the one or more sensing operations and to determine whether the point cloud data from the one or more sensing operations is indicative of the person in the elevator pit.

15. A method of operating a safety net system of an elevator system, the method comprising:

sensing in at least one direction along a first plane defined along a bottom of an elevator pit for an object disposed along the plane;

sensing in at least one direction along a second plane, which is non-coplanar with the first plane, defined along the bottom of the elevator pit for the object disposed along the first plane and the second plane;

generating data corresponding to results of the sensing;

analyzing the data; and determining whether the data is indicative of a person standing in the bottom of the elevator pit based on results of the analyzing.

16. The method according to claim 15, wherein the determining comprises an execution of a machine-learning algorithm that improves an accuracy of the determining over time.

* * * * *